United States Patent [19]
Werra

[11] 3,719,343
[45] March 6, 1973

[54] FLUID PRESSURE ACTUATED DIAPHRAGM VALVE

[75] Inventor: Bruno H. Werra, Waukesha, Wis.

[73] Assignee: Ladish Co., Cudahy, Wis.

[22] Filed: April 8, 1971

[21] Appl. No.: 132,434

[52] U.S. Cl. ............251/61.1, 251/61.2, 137/269
[51] Int. Cl. .................F16k 7/12, F16k 31/145
[58] Field of Search....251/61.1, 61, 61.2, 61.3, 61.4, 251/61.5, 63.5; 137/271, 269

[56] References Cited

UNITED STATES PATENTS 3,310,282  3/1967  Boteler................................251/61

FOREIGN PATENTS OR APPLICATIONS 34,785   8/1905  Switzerland..................251/61.1
748,153  4/1956  Great Britain..................137/269

*Primary Examiner*—Arnold Rosenthal
*Attorney*—Morsell & Morsell

[57] ABSTRACT

A diaphragm valve controlling the flow through a liquid pipe line includes a bonnet having a valve follower therein. An actuator stem has its lower end connected to said follower and has its upper end connected to a second follower movable in a superimposed actuator housing containing upper and lower chambers which are separated by a diaphragm, the latter having its upper surface engaged by said second follower. A control provides for simultaneous introduction of pressure into the valve bonnet and into the upper chamber of the superimposed housing to provide sufficient force to overcome the back pressure of the liquid in the pipe line to close the valve, or for alternative introduction of pressure fluid into the lower chamber only of the superimposed housing to open the valve.

11 Claims, 1 Drawing Figure

PATENTED MAR 6 1973
3,719,343
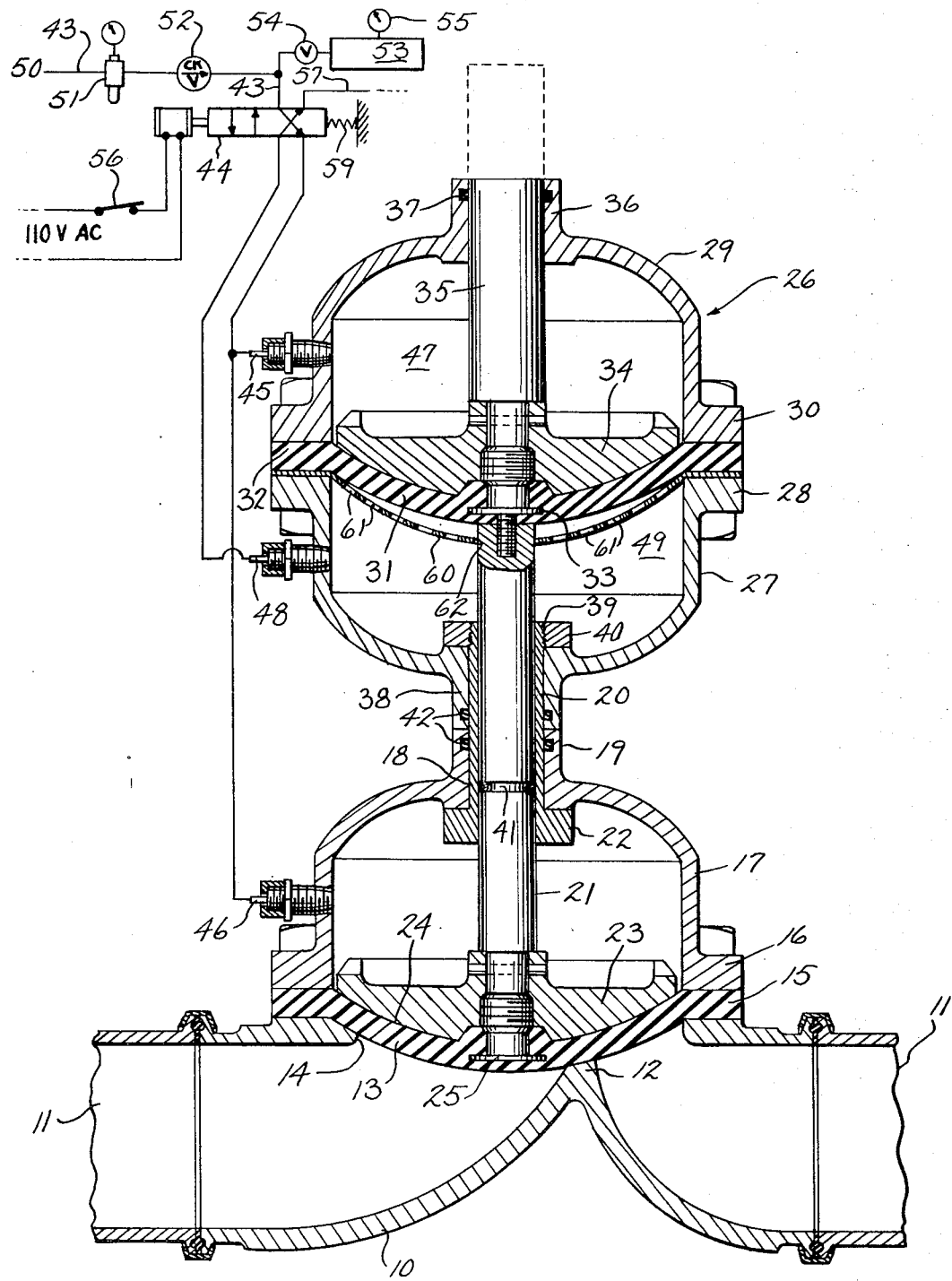
INVENTOR
BRUNO H. WERRA
BY
Morrell & Morrell
ATTORNEYS

FLUID PRESSURE ACTUATED DIAPHRAGM VALVE

BACKGROUND OF THE INVENTION

1. Field of the Invention

The present invention pertains to fluid pressure-actuated diaphragm valves for controlling the flow through a pipe line. It is particularly useful in controlling the flow of liquid food products in the food processing industry, or in controlling the flow of liquids in sanitary or industrial pipe lines.

2. Description of the Prior Art

Diaphragm valves are commonly operated manually or by fluid under pressure such as by compressed air which is available in a plant. It is customary to have an actuator for the diaphragm valve mounted above the valve bonnet, and it has heretofore been necessary to provide sufficient cross-sectional area in the actuator so that when air pressure, which is available in a plant, usually at 50–90 psi, is used, there will be sufficient force during closing of the valve to overcome the back pressure in the product line, which may be as high as 150 psi. This has required the use of rather large pneumatic actuators which are expensive and space-consuming.

SUMMARY OF THE INVENTION

With the present invention there is a fluid pressure chamber formed in the valve bonnet above the follower for the diaphragm valve, and there is a superimposed actuator housing having upper and lower chambers separated by a diaphragm similar to that of the diaphragm valve. A second follower acts on the latter diaphragm and is connected to the upper portion of an actuator stem, the lower end of which is connected to the follower for the diaphragm valve. Means is provided for introducing fluid pressure simultaneously into the upper chamber of the actuator housing and into the bonnet to effect closing of the valve with sufficient force to overcome the back pressure in the product line without using an actuator of objectionably large cross-section.

A general object of the invention is to provide, in a fluid pressure-actuated diaphragm valve, means for reducing the manufacturing cost by providing for the use of multiple components, several of which are identical to one another.

A more specific object of the invention is to provide a fluid pressure-actuated diaphragm valve wherein the valve actuator housing is formed of two cup-shaped components, each of which may be identical with the valve bonnet, whereby economies in manufacture may be effected.

A further object of the invention is to provide a fluid pressure-actuated diaphragm valve with is relatively simple in construction, foolproof in operation, compact, and otherwise well adapted for the purpose described.

With the above and other objects in view, the invention consists of the improved fluid pressure-actuated diaphragm valve, and all of its parts and combinations, as set forth in the claims, and all equivalents thereof.

BRIEF DESCRIPTION OF THE DRAWING

In the accompanying drawing, illustrating a complete embodiment of the preferred form of the invention, the FIGURE is a vertical sectional view through the valve and its actuator, the fluid pressure control system being shown diagrammatically.

DESCRIPTION OF THE PREFERRED EMBODIMENT

Referring more particularly to the drawing, the numeral 10 designates a valve body which is adapted to be interposed in a fluid line 11 for controlling the flow of a liquid product therethrough, such as a liquid food product. The product may be under a pressure which may be as high as 150 psi. The valve body contains a transverse partition or weir 12, and flow from one side of the partition to the other is controlled by a diaphragm 13 which is shown in closing position and which has a spherical closing surface. The diaphragm is projectable through a circular opening 14 in the top of the valve body 10, and the diaphragm has an annular flange 15 which is clamped between the valve body 10 and an annular flange 16 of a valve bonnet 17.

The bonnet 17 has an upper end opening 18 surrounded by a boss 19. A stem sleeve 20 surrounds an intermediate portion of an actuator stem 21 which is slideable therein, said sleeve having a lower end flange 22 limiting upward movement. The lower end of the stem is of reduced diameter and is pinned to a circular follower plate 23 which has a spherical lower surface as at 24 to conform to the diaphragm 13 when the latter is in the closed position of the drawing. The diaphragm is formed of suitable flexible material such as plastic, rubber, or the like, which is pre-formed to the shape illustrated. The lower center of the follower plate 23 is anchored to the center of the diaphragm as at 25. The diaphragm and its follower plate 23 constitute pressure-responsive means.

The upper end of the stem 21 extends into an actuator housing 26. The actuator housing includes a lower cup-shaped portion 27 having an outwardly-projecting annular flange 28, and an upper inverted cup-shaped portion 29 having an outwardly-projecting annular flange 30. A diaphragm 31 has an annular flange portion 32 which is clamped between the flanges 28 and 30 when they are bolted together. The upper end of the stem portion 21 is anchored to the central portion of the diaphragm 31 as at 33, and the diaphragm 31 to the center of a follower 34. An upper stem portion 35 is pinned to the top of the follower 34 and is slideable in a bushing 36 at the top of the housing portion 29, there being a suitable O-ring seal 37.

It is a feature of advantage of the present invention that the valve bonnet 17, the lower actuator housing portion 27, and the upper actuating housing portion 29 may all be identical for most pressures encountered. In addition it is a feature of the present invention that the diaphragm 31 may be of the same size and area as the diaphragm 13, and the follower plates 23 and 34 may be identical for most pressure usually encountered. This greatly reduces manufacturing expense and limits the supply of replacement parts which it is necessary to stock.

The actuator is assembled superimposed relationship with respect to the bonnet 17 by sliding its lower bushing 38 over the stem sleeve 20. The upper end of the stem sleeve is threaded as at 39, and a nut 40 is employed to assemble the housing portion 27 on the bonnet.

There is an O-ring on the portion of the stem 21 which operates in the sleeve 20. In addition, there are O-rings 42 surrounding the sleeve 20.

While the actuator may be operated by any type of fluid pressure, it is usually convenient to use compressed air as the motive fluid, this being readily available in most plants. This is usually at a pressure of 50–90 psi, which is lower than the pressure which usually exists in line 11 — sometimes as high as 150 psi. This compressed air may originate from a suitable source 50 and be directed through a feed conduit 43 to a solenoid-operated valve 44. With the present invention the pressure from the source 50 may be substantially less than the pressure in the line 11.

It is desirable to use a filter-regulator 51 having a gauge thereon. The regulator may be settable in the range of 3–150 psi so that it may be set to regulate the pressure in line 43 as required and substantially less than the maximum back pressure which is to be encountered in the line 11, that is to insure enough air pressure to effect closing movement of the diaphragm 13 without having excessive air pressure acting on the diaphragms. There may also be a check valve 52 in the line 43 which is used only when a reservoir 53 is being employed.

An optional air supply may be provided by reservoir 53 which is normally maintained filled by the source pressure from the line 43. There may also be a shut-off valve 54 in the line from the reservoir which is normally open. In addition, it is desirable to have a pressure gauge 55 on the reservoir as a visual check on air pressure. The check valve 52 prevents air from flowing out through the supply line from the reservoir 53 in case of an air supply failure at the source 50. In the event of a failure of the air supply 50, the reservoir 53 contains enough hair to maintain the diaphragm 13 in the closed position of the drawing provided the switch 56 is in the "off" position. Under normal operation the reservoir 53 has no function. Should there be an air failure in the line 50, or should the air supply pressure drop below a predetermined setting, then air will flow from the reservoir 53 through the ports of the air solenoid valve 44 which lead to the actuator inlet 45 and bonnet inlet 46.

When the solenoid-operating switch 56 is in the "off" position the valve 44 is maintained in the normally open position shown in the drawing by the spring 59, and the compressed air is being directed into the conduits 45 and 46 simultaneously. The conduit 45 leads to the upper chamber 47 of the actuator and the conduit 46 to the chamber within the valve bonnet. Thus, when the valve 44 is in the position shown in the drawing, the diaphragm 13 will be in the valve-closing position shown in the drawing, with air being exhausted through the line 48 from the lower portion of the actuator housing, through the valve 44 to the exhaust outlet 57.

Inasmuch as the pressure in a product line such as the line 11 may be as high as 150 psi, sufficient actuating pressure is required to overcome the back pressure in the product line. Heretofore it has been necessary to make the actuator housing, such as the housing 26, of much larger size so as to provide a piston or diaphragm area of sufficient size that enough force is produced by the air pressure from the line 43 to overcome the back pressure of the liquid in the pipe line during valve closing. The reason for this is that the usual air pressure in a plant is between 50 and 90 psi. With the present invention the actuator housing 26 may be substantially the same diameter as the valve bonnet 17, because the closing air pressure operates not only in the chamber 47 of the actuator, but also in the bonnet 17 against the follower plate 23. Thus the area of the follower plate 23, plus the area of the follower plate 34, is acted upon by the air pressure to produce sufficient force to overcome the back pressure in the pipe line. The air pressure from the source 50 can be substantially less than the maximum liquid product pressure to be encountered in the line 11, and this pressure from the source is maintained at this desired level by the filter-regulator 51.

When it is desired to open the valve diaphragm 13 the remote solenoid-operating electric switch 56 is moved to an "on" position. This causes the solenoid air valve 44 to be shifted to the right so that the air pressure in the system is directed from the supply line 43 through the conduit 48 which leads to the lower chamber 49 of the actuator. This opens the valve diaphragm 13, air being simultaneously exhausted from the lines 45 and 46 through the valve 44 into the exhaust outlet 57 leading to atmosphere. This is all the pressure that is necessary on opening movement because opening movement is aided by liquid pressure in the pipe line 11, whereas closing movement is opposed by such pressure. When the diaphragm valve is open, the diaphragms 13 and 31 flex to a reverse position from that illustrated. As long as air pressure is being used for the necessary valve-closing movement, it is convenient to also employ air pressure through the line 48 to aid in opening the diaphragm valve. However, such opening movement could be accomplished by any suitable means such as spring action in the lower portion of the actuator housing, aided by the back-pressure from the line 11.

Should there be an electrical failure, the valve 44 will automatically be urged by spring 59 to the position shown in the drawing so that, in case of electrical failure, the valve diaphragm 13 will always be urged to closed position. Thus the arrangement is "fail safe" electrically, and is also "fail safe" as far as the air supply is concerned, due to the use of the emergency reservoir 53.

In certain pressure situations it may be desirable to provide means for protecting the diaphragm 31 from ballooning as a result of abnormal pressures in the chamber 47. This may be effectively accomplished by clamping the surrounding flange of a perforated spherical metal disk 60 between the lower portions of the flange 32 of the diaphragm 31 and the flange 28 of the lower housing portion 27. This plate will have a multiplicity of holes 61 therein to allow air pressure in the chamber 49 to act on the lower side of the diaphragm 31 during opening of the diaphragm valve 13. In a preferred embodiment the holes 61 will be 5/32 of an inch in diameter, and the centers of the holes will be one-fourth of an inch from each other to provide a 3/32 of an inch webbing between adjacent holes.

The plate 60 may be constructed of stainless steel of a desired thickness, such as one-sixteenth of an inch, and the spherical portion of the plate at the center will be spaced a predetermined distance below the center of the diaphragm 31, such as one-eighth to three-sixteenth of an inch, to allow sufficient movement of the diaphragm 31 to insure tight closing of the valve 13. At the same time the plate 60 is close enough to the bottom of the diaphragm 31 that any excessive ballooning of the diaphragm 31 from excessive pressures which might be encountered during normal conditions will be prevented. The plate 60 will have a central opening 62 large enough to provide for free movement of the valve stem 21 therethrough.

From the above it is clear that not only is sufficient valve-closing force provided with a small-sized housing but, in addition, the entire structure may, for most uses, be formed of common components as heretofore explained to lower manufacturing costs substantially.

It is to be understood that I do not desire to be limited to the exact details of construction shown and described, for obvious modifications will occur to a person skilled in the art.

What I claim is:

1. In a valve having a body through which liquid under a relatively high pressure is adapted to flow and having means including a diaphragm valve for controlling said flow, said valve including a diaphragm, the improvement comprising an externally-projecting bonnet with a motive fluid chamber therein over the diaphragm valve, the diaphragm of said diaphragm valve forming one wall of said motive fluid chamber and being acted on by motive fluid therein, an actuator housing supported adjacent said bonnet, pressure-responsive means in said actuator housing positioned to be moved by pressure therein, an operating connection between said pressure-responsive means and diaphragm valve for transmitting movement to the latter, and means for simultaneously introducing motive fluid under a relatively low pressure into the motive fluid chamber of the valve bonnet and into said actuator housing in a location to act in a valve-closing direction on the pressure-responsive means therein, the effective area of said pressure-responsive means in the actuator housing plus the effective area of the diaphragm valve being such that the action of the motive fluid on said areas in the two chambers provides sufficient force in closing the valve to overcome the back pressure of liquid flowing through the valve body.

2. A valve as claimed in claim 1 in which there is a follower plate over the diaphragm valve which is acted on by the motive fluid in the bonnet and in which the area of said follower plate supplements the area of the pressure-responsive means in the actuator housing.

3. A valve as claimed in claim 1 in which the actuator housing is superimposed on the bonnet and in which the operating connection between the pressure-responsive means and diaphragm valve is a stem, and in which there is a sleeve between the actuator housing and bonnet through which said stem is slideable.

4. A valve as claimed in claim 1 in which the actuator housing of substantially the same cross-sectional area as the valve bonnet.

5. A valve as claimed in claim 1 in which there is a follower plate over the diaphragm valve which is acted on by the motive fluid in the bonnet, and in which the pressure-responsive means in the actuator housing comprises a diaphragm with a follower plate thereon.

6. In a valve having a body through which liquid under a relatively high pressure is adapted to flow and having means including a diaphragm valve for controlling said flow, the improvement comprising an externally-projecting bonnet with a motive fluid chamber therein over the diaphragm valve, an actuator housing supported adjacent said bonnet, pressure-responsive means in said actuator housing positioned to be moved by pressure therein, an operating connection between said pressure-responsive means and diaphragm valve for transmitting movement to the latter, means for simultaneously introducing motive fluid under a relatively low pressure into the motive fluid chamber of the valve bonnet and into said actuator housing in a location to act in a valve-closing direction on the pressure-responsive means therein, the effective area of said pressure-responsive means in the actuator housing plus the effective area of the diaphragm valve being such that the action of the motive fluid on said areas in the two chambers provides sufficient force in closing the valve to overcome the back pressure of liquid flowing through the valve body, the actuator housing having upper and lower chambers and the pressure-responsive means being a diaphragm separating said two chambers and there being means operable in the lower chamber of the actuator housing to open the diaphragm valve.

7. A valve as claimed in claim 6 in which there is means for selectively introducing motive fluid into the lower chamber of the actuator housing when it is desired to open the diaphragm valve.

8. A valve as claimed in claim 6 in which the actuator housing is formed of two cup-shaped components connected together at their open ends with the diaphragm therebetween, each of said components being interchangeable with the bonnet for the valve.

9. A valve as claimed in claim 7 in which there is a perforated stationary spherical plate in the lower chamber of the actuator housing below the diaphragm therein positioned to prevent ballooning of said diaphragm while permitting motive fluid in the lower chamber to act on the diaphragm during opening of the valve.

10. In a valve having a body through which liquid under a relatively high pressure is adapted to flow and having means including a diaphragm valve for controlling said flow, the improvement comprising an externally-projecting bonnet with a motive fluid chamber therein over the diaphragm valve, an actuator housing supported adjacent said bonnet, pressure-responsive means in said actuator housing positioned to be moved by pressure therein, an operating connection between said pressure-responsive means and diaphragm valve for transmitting movement to the latter, means for simultaneously introducing motive fluid under a relatively low pressure into the motive fluid chamber of the valve bonnet and into said actuator housing in a location to act in a valve-closing direction on the pressure-responsive means therein, the effective area of said pressure-responsive means in the actuator housing plus the effective area of the diaphragm valve being such that the action of the motive fluid on said areas in the two chambers provides sufficient force in closing the valve to overcome the back pressure of liquid flowing through the valve body, a follower plate over the diaphragm valve which is acted on by the motive fluid in the bonnet, said pressure-responsive means in the actuator housing comprising a diaphragm with a follower plate thereon, said actuator housing having upper and lower chambers and the diaphragm in said actuator housing separating said two chambers, said last diaphragm and the valve diaphragm being of the same area, the follower plate in the actuator housing being interchangeable with the follower plate in the bonnet.

11. In a valve having a body through which liquid under a relatively high pressure is adapted to flow and having means including a diaphragm valve for controlling said flow, the improvement comprising an externally-projecting bonnet with a motive fluid chamber therein over the diaphragm valve, an actuator housing supported adjacent said bonnet, pressure-responsive means in said actuator housing positioned to be moved by pressure therein, an operating connection between said pressure responsive means and diaphragm valve for transmitting movement to the latter, means for simultaneously introducing motive fluid under a relatively low pressure into the motive fluid chamber of the valve bonnet and into said actuator housing in a location to act in a valve-closing direction on the pressure-responsive means therein, the effective area of said pressure-responsive means in the actuator housing plus the effective area of the diaphragm valve being such that the action of the motive fluid on said areas in the two chambers provides sufficient force in closing the valve to overcome the back pressure of liquid flowing through the valve body, in which the bonnet has an annular outwardly-projecting flange positioned over the margin of the diaphragm valve and in which the upper portion of the bonnet has an upwardly-projecting boss, in which the actuator housing is formed of two components which are interchangeable with said bonnet and which are connected together at their open ends with the diaphragm therebetween, one of said components having a depending boss which is supported in alignment with the boss of the bonnet, there being a stem slideable through said connected bosses and having its upper end connected to the diaphragm in the actuator housing and its lower end connected to the diaphragm valve.

* * * * *